United States Patent Office 2,854,438
Patented Sept. 30, 1958

2,854,438

ESTERS OF N-CARBAMYLAMIC ACIDS FROM ALPHA OLEFINIC ALKENE DIOIC ACID ANHYDRIDES

Robert H. Snyder, Newark, and Pliny O. Tawney, Passaic, N. J., assignors to United States Rubber Company, New York, N. Y., a corporation of New Jersey No Drawing. Application November 30, 1953
Serial No. 395,281

18 Claims. (Cl. 260—75)

This invention relates to esters of N-carbamylamic acids, derived from intramolecular anhydrides of alpha-olefinic alkenedioic acids wherein the two carbonyl groups are separated by two carbon atoms, the said esters having a cis configuration if they are structurally capable of existing in cis and trans forms.

These N-carbamylamic acids, typified by N-carbamyl-maleamic acid (maleuric acid), are very weak, i. e., practically un-ionizable, and our efforts to find a general method of preparing esters by reaction between any of these acids and an alcohol have been unsuccessful.

We have discovered, however, that a new class of chemicals, the N-carbamylimides, react easily with compounds which contain one or more non-tertiary carbinol groups, i. e., primary or secondary alcoholic hydroxyl groups, to form esters of N-carbamylamic acids. The ease with which the imide ring is opened in the new reaction is entirely unexpected in view of the known stability, toward alcohols, of the similar heterocyclic rings present in maleimide and phthalimide and their N-alkylated and N-arylated derivatives, many of which can actually be purified by recrystallization from alcohols, without change.

The N-carbamylimides which we employ in our reaction have the structure

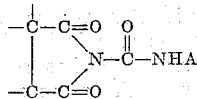

wherein A is hydrogen or a hydrocarbon radical, and any two of the remaining bonds are satisfied by hydrogen or acyclic hydrocarbon, and the remaining two bonds are so arranged that the molecule contains one olefinic group, i. e., >C=C<, connected directly to at least one of the carbonyl groups. These new N-carbamylimides are prepared from the corresponding N-carbamylamic acids, as shown in detail hereinafter, and in a copending application of Robert H. Snyder, Serial No. 367,108, filed July 9, 1953, which is a continuation-in-part of his application Serial No. 312,870, filed October 2, 1952.

Typical N-carbamylimides which are operable in our invention are N-carbamylmaleimide, N-carbamylitaconimide, N - carbamylcitraconimide, N - (ethylcarbamyl)-maleimide, N - (n-butylcarbamyl)-maleimide, N - (tert-butylcarbamyl)-maleimide, N - (phenylcarbamyl)-maleimide, N-(cyclohexylcarbamyl)-maleimide, N - (benzylcarbamyl)-maleimide, N - (ethylcarbamyl)-itaconimide and N-(ethylcarbamyl)-citraconimide. N-carbamylmaleimide is the preferred member of this class, and the preferred N-carbamylamic esters of this invention are the maleurates. Therefore, N-carbamylmaleimide and the esters made therefrom will be used hereinafter in describing and illustrating our invention, except where otherwise stated specifically.

The formation of the maleurates is illustrated as follows:

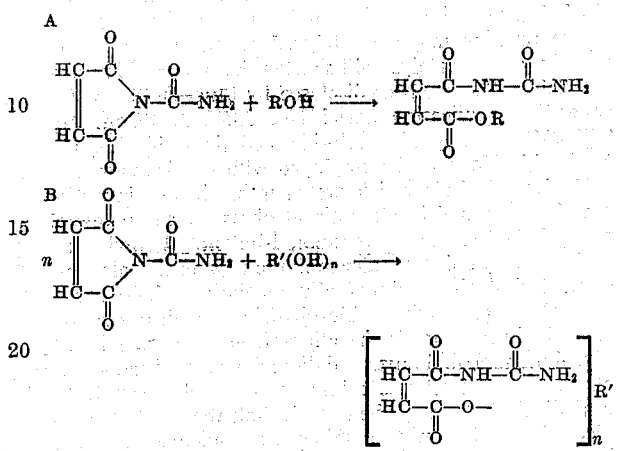

wherein R and R' are the residues of non-tertiary alcohols, which can contain one or more additional hydroxyl groups not involved in the esterification reactions A and B. The symbol $n$ is an integer.

The N-carbamylmaleamic esters are formed simply by reacting N-carbamylmaleimide and an alcohol, as aforesaid, in an appropriate solvent. This solvent usually is the alcohol taking part in the reaction, an excess being used over that converted to the ester.

However, when the reagent alcohol is one which boils at a very high temperature at atmospheric pressure, we prefer to use the alcohol in little or no excess over that amount needed in the esterification, and to use with it an inert solvent which boils at a lower temperature than the alcohol, thereby simplifying the process of purifying the ester. Furthermore, in the special cases in which we wish to react N-carbamylmaleimide with substantially all of the hydroxyl groups of a liquid polyhydric alcohol, or in which the alcohol is a solid which melts or decomposes above about 140° C., the use of an inert solvent is essential because the N-carbamylmaleimide, the alcohol, and/or the desired product normally are solid materials. p-Dioxan is a suitable solvent.

Each non-tertiary hydroxyl group of an alcohol can react with one molecule of an N-carbamylimide. For example, one molecule of N-carbamylmaleimide can react with ethylene glycol to form 2-hydroxyethyl maleurate, whereas two molecules of the imide can react with the glycol to form ethylene dimaleurate with or without the isolation of the intermediate 2-hydroxyethyl maleurate.

The temperature of the esterification can be varied over a wide range, e. g., from about room temperature (20° C.) to about 140° C. The more active alcohols such as methanol and ethanol will react with N-carbamylmaleimide within a few minutes at room temperature, especially when the mixture is stirred rapidly. The higher monohydric alcohols, e. g., 1-dodecanol, and the polyhydric alcohols react with N-carbamylmaleimide less rapidly, so that it is essential to heat the reaction mixture in order to carry out the esterification in a reasonable length of time. Above about 140° C. the yield of the desired ester decreases rapidly because of decomposition of N-carbamylmaleimide and/or the ester formed therefrom. For highest yield and purity of the ester we prefer to hold the reaction temperature below about 110° C.

It is advisable to use substantially anhydrous reagents and solvents generally in our reaction, because N-carbamylimides such as N-carbamylmaleimide react with water to form N-carbamylamic acids such as N-carbamylmaleamic acid. This competing hydrolysis reaction usually appears to be at least as rapid as the desired esterification. Once the N-carbamylmaleamic acid is formed it cannot be esterified directly. Consequently, while we can obtain a substantial yield of, for example, ethyl N-carbamylmaleamate from 95% ethyl alcohol, we prefer to use absolute alcohol for maximum yield and purity of the ester.

The recation may be catalyzed or uncatalyzed. The use of a proper catalyst will shorten the time and improve the yield. The catalysts disclosed by Pliny O. Tawney in copending application Serial No. 395,283, Patent No. 2,794,012, namely, zinc chloride, cadmium chloride, and ferric chloride, may be employed with our invention.

Typical alcohols which are operable in our invention are the monohydric aliphatic alcohols, e. g., methanol, ethanol, 1-propanol, 2-propanol, 1-butanol, 2-ethylhexan-1-ol, 1-dodecanol, 1-octadecanol; the unsaturated alcohols, e. g., allyl alcohol and methallyl alcohol; the halogenated alcohols, e. g., ethylene chlorohydrin; the nitro alcohols, e. g., 2-nitrobutanol-1; the ether-alcohols, e. g., ethylene glycol monomethyl ether and diethylene glycol monoethyl ether; the cycloalkyl alcohols, e. g., cyclohexanol; the aralkyl alcohols, e. g., benzyl alcohol; the tertiary-amino alcohols, e. g., triethanolamine; the cyanoalcohols, e. g., beta-cyanoethanol; the alcohols formed by reduction of the carbon monoxide-olefin products made by the "oxo" process; the hydroxy acids and esters, e. g., glycolic acid; the polyhydric alcohols, e. g., ethylene glycol, the polyethylene glycols, polymeric alcohols which have been formed by oxidizing and then partially reducing isoolefin:conjugated diolefin copolymers, alkyd resins having terminal alcoholic hydroxyls, glycerol, pentaerythritol, cellulose, starch, glucose, sucrose, sorbitol, polyvinyl alcohol, and partial ethers and esters thereof; monoglycerides; diglycerides; triglycerides containing one or more alcoholic hydroxyl groups, e. g., castor oil and "blown" oils made from oils such as soya and linseed oils; methylol phenols, e. g., 2,6-dimethylol 4-alkyl-phenols and their condensation polymers; N-methylol compounds, e. g., N-methylolmaleimide and N,N'-dimethylolurea; and alcohols containing sulfone groups, e. g., those alcohols made from a glycol and divinyl sulfone. Tertiary alcohols are not operable in our invention.

The esters of compounds containing non-tertiary carbinol groups can, broadly, be sub-divided into two major classes:

(A) Esters of monohydric alcohols; e. g., monoesters; and (B) Esters of polyhydric alcohols, which esters can be either mono- or di- or tri- or higher esters depending on the number of hydroxyl groups reacted.

Class B can be further separated into sub-classes:

(B)-1. Esters of polyhydric alcohols having more than two hydroxyls, e. g., esters of castor oil.

(B)-2. Esters of polyhydric alcohols having only carbon and hydrogen atoms other than the hydroxyl groups, e. g., ethylene dimaleurate.

(B)-3. Esters of polyhydric alcohols having repeating ester groups, e. g., maleuric acid esters of an alkyd resin having terminal alcoholic hydroxyl groups.

(B)-4. Esters of polyhydric alcohols having repeating alkylene ether groups, e. g., maleuric acid esters of polyglycol ethers.

(B)-5. Esters of polyhydric alcohols containing sulfone groups, e. g., of complex glycols which are derived from a simple glycol and divinyl sulfone.

The preferred acids conforming to the class of N-carbamylimides

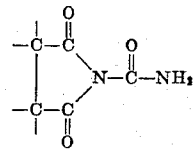

that are usable for preparation of each of the above classes of esters, broadly, as well as particularly, are maleic acid, citraconic acid, and itaconic acid. The corresponding N-carbamylimides are N-carbamylmaleimide, N-carbamylitaconimide, and N-carbamylcitraconimide.

The maleuric esters fall into two very different groups—those from monohydric alcohols, and those from polyhydric alcohols. As shown by Pliny O. Tawney in a copending application Serial No. 395,282, Patent No. 2,721,186, filed November 30, 1953, the maleuric esters can be polymerized to form useful resins. While all of the maleuric esters will form such polymers, the maleuric esters of polyhydric alcohols have a distinctive property not possessed by the maleuric esters of monohydric alcohols; namely, the extremely useful ability to form crosslinked heteropolymers which can form thermosettable coatings and castings which do not craze or shrink.

This valuable property can be used, for example, to make materials which are similar to, but superior to, polystyrene. Polystyrene is one of the most useful of plastic materials. It is cheap, transparent, capable of being dyed to form beautiful, clear articles in many color shades, easily and rapidly moldable into any of many desirable shapes, etc. However, it has three major deficiencies; namely, it is soluble in many organic liquids, it is a permanently thermoplastic material which softens at so low a temperature that articles made from it cannot be used above about 90° C., and it is brittle. Tawney has further shown that these defects can be overcome by copolymerizing styrene with one, or a mixture of several, maleuric esters of polyhydric alcohols. Presumably, this improvement is due to the formation of a three-dimensional macromolecular structure. As styrene is only difunctional, it cannot homopolymerize to form such a structure. However, an ester containing at least two maleurate groups is tetrafunctional, i. e., it can react with a difunctional monomer to form three-dimensional, i. e., crosslinked, materials.

In making such crosslinked heteropolymers, Tawney prefers to use maleuric esters of a particular type of polyhydric alcohol; namely, an alkyd resin having terminal alcoholic hydroxyl groups. He has found that di-maleuric esters made from such alkyds are especially useful for making tough and rigid or slightly flexible solid heteropolymers.

The alkyd resin used in his invention can be made from any polycarboxylic acid, or mixture thereof, and any polyhydric alcohol or mixture thereof, provided only that the reaction conditions and the proportions of the acidic and alcoholic reagents are such as to cause the alkyd chains to terminate with free hydroxyl groups rather than with free carboxyl groups. Such alkyd resins and methods for making them are, of course, well known. It is also well known that by varying the reaction time at a given temperature the average molecular weight of the alkyd resin can be changed. As we show hereinafter, by varying the acid, the alcohol, or the molecular weight of the alkyd we can change the properties of the maleurate esters of the alkyd in order to form heteropolymeric materials fitted for many specific uses.

Typical polycarboxylic acids which can be used in making alkyds suitable for use in Tawney's invention are succinic acid, glutaric acid, adipic acid, pimelic acid, suberic acid, azelaic acid, sebacic acid, maleic acid, fumaric acid, citric acid, citraconic acid, itaconic acid, aconitic acid, phthalic acid, isophthalic acid, terephthalic acid, 3,6- endomethylene-1,2,3,6-tetrahydrophthalic acid, and mixtures thereof. The anhydrides of these acids, when available, are equivalent to the acids in making alkyds, and are generally used commercially in preference to the acids for economic reasons.

Typical polyhydric alcohols used in making the alkyds are ethylene glycol, propylene glycol, diethylene glycol, glycerol, 1,2,4-butanetriol, and mixtures thereof.

While all of the N-carbamylamic esters can be copolymerized, as shown by application Serial No. 395,282, Patent No. 2,721,186, to form useful products, certain of these esters are even more useful as such. For example, polymaleuric esters made from polyhydric alcohols having at least two hydroxyl groups in non-terminal positions on acyclic chains are valuable plasticizers for other resins. The maleuric di-esters and tri-esters of castor oil plasticize urea-formaldehyde resins, ethyl cellulose, and, to some extent, cellulose acetate.

Application Serial No. 395,282, Patent No. 2,721,186, also shows that the maleuric esters made from castor oil form valuable homopolymers. It is well known that raw castor oil is not a drying oil because it lacks olefinic unsaturation. The new maleuric esters of castor oil, in contrast, are especially useful as heat-hardening and drying oils in paints and varnishes. The introduction of maleuric groups into the castor oil molecule not only gives the unsaturation needed in a drying oil but also confers improved compatibility of the products with polar paint varnish compounding ingredients.

The N-carbamylimides used in our invention are made from the corresponding N-carbamylamic acids. Each of these is made from the anhydride of the appropriate dicarboxylic acid and a urea. A preferred method of carrying out the latter reaction is described in the copending application of Snyder, Serial No. 312,869, filed October 2, 1952. His method of making the N-carbamylamic acids and the N-carbamylimides therefrom is illustrated as follows:

A solution of 500 g. of maleic anhydride and 300 g. of urea in 1000 ml. of glacial acetic acid is heated at 50° C. for 12 hours, during which time maleuric acid begins to crystallize. The mixture is allowed to cool and is left overnight at room temperature. Then the white crystalline product is filtered, washed with glacial acetic acid, and dried at 50° C. The maleuric acid, 405 g., or 56% of theory, melts at 161–162° C. with decomposition.

Similarly, a urea is reacted in glacial acetic acid with an equivalent amount of an intramolecular anhydride of another alpha-olefinic alkenedioic acid to give the appropriate N-carbamylamic acid. Typical N-carbamylamic acids are the following:

N-carbamylitaconamic acid, M. P. about 200° C. with decomposition.
N-carbamylcitraconamic acid, M. P. 145–149° C.
N-(n-butylcarbamyl)-maleamic acid, M. P. 105.5–107° C.
N-(tert-butylcarbamyl)-maleamic acid, M. P. 151.5–153.5° C.
N-(phenylcarbamyl)-maleamic acid, M. P. 162–163° C.

The anhydrides from which the N-carbamylamic acids are made are intramolecular and are derived from dibasic acids having two carbon atoms separating the two carboxylic groups. The anhydrides also are olefinically unsaturated in a position alpha to at least one of the carbonyl groups.

Typical anhydrides wherein the olefinic group is in a position alpha to both carbonyl groups are maleic anhydride, citraconic anhydride, alpha-ethylmaleic anhydride, and dimethylmaleic anhydride. The N-carbamylamic esters made from any of these anhydrides can exhibit cis-trans isomerism. The esters having the cis configuration are the subject of this invention. The corresponding esters having the trans configuration are the subject of a copending application of Kelly and Bryan, Serial No. 395,284, Patent No. 2,809,190, filed November 30, 1953.

Typical anhydrides wherein the olefinic group is in a position alpha to only one of the carbonyl groups, i. e., wherein the olefinic group does not constitute part of the hydrocarbon chain separating the carbonyl groups, are itaconic anhydride and beta-methylitaconic anhydride. The N-carbamylamic esters made from this class of anhydrides cannot exhibit cis-trans isomerism. These esters also are the subject of this invention.

The urea for making the N-carbamylimides can be urea ($NH_2$—CO—$NH_2$) itself or a urea which has a hydrocarbonyl radical instead of one of the hydrogen atoms. This radical can be any radical containing only carbon and hydrogen, such as an alkyl, alkenyl, cycloalkyl, terpenyl, aralkyl, or aryl group. Typical alkyl ureas are N-methylurea, N-ethylurea, N-propylurea, N-isopropylurea, N-n-butylurea, N-sec-butylurea, N-isobutylurea, N-tert-butylurea, the N-amylureas, N-n-hexylurea, N-n-heptylurea, N-n-octylurea, N-(2-ethylhexyl)-urea, N-n-nonylurea, N-n-dodecylurea and N-n-octadecylurea. Typical alkenyl ureas are N-allylurea, N-methallylurea and N-crotylurea. A typical cycloalkyl urea is N-cyclohexylurea. A typical terpenyl urea is N-bornylurea. Typical aralkyl ureas are N-benzylurea and N-phenethylurea. Typical aryl ureas are N-phenylurea, the three N-tolylureas, and the two N-naphthylureas.

The N-carbamylamic acids are converted to the corresponding N-carbamylimides, as illustrated with maleuric acid:

A mixture of 50 parts of maleuric acid and 120 parts of glacial acetic acid is heated to about 80° C. Acetic anhydride (50 parts) is added gradually to the stirred mixture, which is held at the same temperature until practically all of the suspended maleuric acid has disappeared. The hot solution is filtered, and cooled to room temperature, causing crystallization of a white product. This material, the new compound N-carbamylmaleimide, melts at 157–158° C.

Similarly, each of other typical N-carbamylamic acids is converted to the corresponding N-carbamylimide:
N-carbamylitaconimide, M. P. 92–98° C.
N-carbamylcitraconimide, M. P. 110–115° C.
N-(n-butylcarbamyl)-maleimide, M. P. 66.5–68° C.

This white compound did not crystallize until the solution was evaporated, in vacuo, to about half volume. It was recrystallized from a mixture of benzene and Skellysolve B (a petroleum fraction which is chiefly n-hexane).

N-(tert-butylcarbamyl)-maleimide, M. P. 106.0–107.5° C.

This white compound did not crystallize until the solution was evaporated in vacuo to half volume. It was recrystallized from carbon tetrachloride.

N-(phenylcarbamyl)-maleimide, M. P. 140–141° C.

This pale yellow compound was recrystallized from benzene.

The following examples illustrate our invention, the parts being by weight.

EXAMPLE 1

(a) A mixture of 203 parts of N-carbamylmaleimide and 320 parts of methanol was boiled under a reflux condenser for an hour. The hot solution was treated with decolorizing carbon and filtered. It was then cooled to room temperature, causing the product to crystallize. After filtration and washing with alcohol the air-dried methyl N-carbamylmaleamate was obtained in 80% yield (200 parts) as a white solid melting at 110–113° C. After recrystallization from methanol it melted at 113–114° C.

*Analysis.*—Calcd. for $C_6H_8N_2O_4$: nitrogen, 16.29%. Found: nitrogen, 16.36, 16.38%.

(b) When N-carbamylmaleimide and excess methanol were mixed and allowed to stand at room temperature, with occasional shaking, the solid gradually disappeared within 12 hours. The homogeneous solution was evaporated to small volume at room temperature, causing the methyl N-carbamylmaleamate to crystallize in almost quantitative yield and in high purity.

(c) When a similar reagent mixture was stirred rapidly and continuously the reaction was completed within two hours at room temperature.

EXAMPLE 2

Each of the following esters of N-carbamylmaleamic acid was made by boiling N-carbamylmaleimide with excess of the respective alcohol as in Example 1(a), except that the reaction time was varied as shown:

*Esters of N-carbamylmaleamic acid*

| | Alcohol | Ester Yield (Percent) | Melting Point (° C.) | Reaction Time (Hours) | Nitrogen Analysis (Percent) | |
|---|---|---|---|---|---|---|
| | | | | | Calcd. | Found |
| a | Ethanol (95%) | 70 | 111–112 | 2 | 15.05 | 14.84, 15.01 |
| b | 2-Propanol | 75 | 113–114 | 16 | 14.00 | 13.95, 13.97 |
| c | Ethylene glycol | a, b 60 | 131.0–131.5 | 2 | 13.85 | 13.59, 13.71 |
| d | Allyl alcohol | 40 | 109–111 | 5 | 14.13 | 14.02, 13.99 | a Beta-hydroxyethyl N-carbamylmaleamate.
b The reaction mixture was heated on the steam bath without reflux.

EXAMPLE 3

The following N-carbamylmaleamic esters were made by boiling under reflux a mixture of N-carbamylmaleimide, a slight molar excess of the appropriate alcohol, and about six volumes of p-dioxan per volume of the sum of the reagents, for 16 hours. Most of the dioxan was removed in vacuo, causing the desired ester to crystallize. The ester was purified by recrystallization from an appropriate solvent, as shown:

*Esters of N-carbamylmaleamic acid made in dioxan*

| | Alcohol | Solvent of Recrystn. | Ester Yield (Percent) | Melting Point (° C.) | Nitrogen Analysis (Percent) | |
|---|---|---|---|---|---|---|
| | | | | | Calcd. | Found |
| a | 1-Butanol | CCl₄ | 47 | 95–99 | 13.09 | 13.25–13.33 |
| b | 1-Dodecanol | Ethanol | 40 | 110–111 | 12.15 | 12.23, 12.23 |
| c | 2-Ethoxyethanol | Toluene | 50 | 109–110 | 8.58 | 8.42, 8.39 |
| d | Benzyl alcohol a | Water | 50 | 130–131 | 11.28 | 11.25 | a Refluxed for 30 hours.

EXAMPLE 4

A mixture of 13.2 parts of 2,6-dimethylol-4-tert-butylphenol, 21.0 parts (excess) of N-carbamylmaleimide and 250 parts of dioxan was heated at 55° C. for 5 hours with stirring. The solution was then evaporated to small volume in vacuo. On adding benzene to the residue, crude 2-hydroxy-5-tert-butyl-1,3-xylylene bis(N-carbamylmaleamate) was precipitated in practically quantitative yield as a fine, white powder melting at 115–122° C. A portion of the product was extracted several times with aqueous 10% sodium bicarbonate solution in order to remove any unreacted N-carbamylmaleimide. The product was then dissolved in ethyl acetate, and reprecipitated by benzene. The purified product melted at 128–130° C. with decomposition.

*Analysis.*—Calcd. for $C_{22}H_{26}O_9N_4$: carbon, 53.9%; hydrogen, 5.3%; nitrogen, 11.4%. Found: carbon, 53.4, 53.9%; hydrogen, 5.4, 5.4%; nitrogen, 11.7%.

EXAMPLE 5

The gradual addition of 2.6 parts of N-(beta-hydroxyethyl)-morpholine to a solution of 2.8 parts of N-carbamylmaleimide in 50 parts of dioxan caused an immediate evolution of heat. After the exothermic reaction was over the mixture was left at room temperature for several hours, during which time a tan solid crystallized. This was filtered and dried, yielding 4.0 parts of crude beta-(1-morpholinyl)-ethyl maleurate. It was re-crystallized from ethyl acetate. The purified white powder melted at 121.5–122.5° C.

*Analysis.*—Calcd. for $C_{11}H_{17}O_5N_3$: nitrogen, 15.4%. Found: nitrogen, 15.3, 15.2%.

EXAMPLE 6

Cotton linters and N-carbamylmaleimide (one mol per $C_6$ unit of the cellulose) were heated together in an organic liquid at reflux temperature for 2 hours in the presence and absence of zinc chloride. The treated cotton was then washed with water and with acetone, and dried. It looked like the untreated cotton, but the nitrogen analysis showed that it had reacted with N-carbamylmaleimide.

| Medium | $ZnCl_2$ (mol) | Nitrogen (percent) a |
|---|---|---|
| Acetone | 0.00 | 0.19 |
| Dioxan | 0.05 | 0.28 | a The percentage of combined N-carbamylmaleimide is five times the nitrogen content.

This example also shows the feature of using a catalyst described by Tawney in copending application Serial No. 395,283, Patent No. 2,794,012, filed November 30, 1953.

EXAMPLE 7

Ethyl cellulose (47.5–49% ethoxyl content) and cellulose acetate (54–55% acetate) was dissolved in separate portions of a solution of N-carbamylmaleimide in dioxan (one mole of N-carbamylmaleimide per glucose unit of the cellulose derivative). The solutions were refluxed for 7 hours and then poured into water. The precipitated cellulosic material was washed with water, and then dissolved in acetone and reprecipitated in water. The products looked like the respective untreated cellulose derivatives, but nitrogen analyses showed that reaction had occurred.

Nitrogen (percent) [1]
Ethyl cellulose _____ 0.85
Cellulose acetate _____ 0.45

[1] See note (a), Example 6.

This modification improves the shrink resistance and mildew resistance of the cellulose and cellulose derivatives used in Examples 6 and 7.

EXAMPLE 8

A mixture of one part of N-carbamylitaconimide and ten parts of methanol was boiled under reflux for an hour, and then the solution was evaporated to about half its original volume. The new compound, methyl itaconurate, crystallized from the cooled solution in the form of white needles; yield 0.5 part, melting at 155–160° C. The two isomeric structures

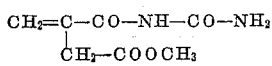

and

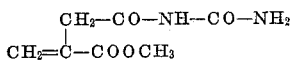

are possible. The wide melting point range suggests that a mixture of both isomeric forms of methyl itaconurate was obtained.

*Analysis.*—Calcd. for $C_7H_{10}O_4N_2$: nitrogen, 15.0%. Found: 14.7.

EXAMPLE 9

The experiment shown in Example 8 was repeated except that N-carbamylcitraconimide was used instead of N-carbamylitaconimide. The methyl citraconurate, a white crystalline powder, melts at 150–155° C. A mixed melting point with the product of Example 8 shows that they are not the same. Methyl citraconurate may have either or both of the two structures:

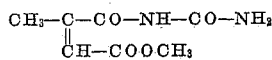

and

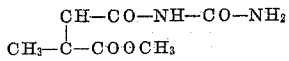

The wide melting point range suggests that a mixture of both isomeric forms of methyl citraconurate was obtained.

*Analysis.*—Calcd. for $C_7H_{10}O_4N_2$: nitrogen, 15.0%. Found: 15.2.

The following examples illustrate not only our invention but also the use of a catalyst, described by Tawney in his copending application Serial No. 395,283, Patent No. 2,794,012, filed November 30, 1953.

EXAMPLE 10

A mixture of 28 parts of N-carbamylmaleimide, 112.7 parts of ethylene chlorohydrin and 0.5 part of zinc chloride was heated at 90–100° C. for 2 hours. The solution was filtered to remove a small amount of undissolved material, and then a mixture of n-hexane and ether was added to the filtrate in order to precipitate the white product, beta-chloroethyl maleurate. Yield, 66% of theory (29 parts). Melting point, after recrystallization from toluene, 116–119° C.

*Analysis.*—Calcd. for $C_7H_9O_4N_2Cl$: nitrogen, 12.68%. Found: nitrogen, 12.62%, 12.84%.

EXAMPLE 11

A mixture of 11.2 parts of N-carbamylmaleimide, 2.48 parts of ethylene glycol, one part of zinc chloride and 100 parts of dioxan was heated on the steam bath for one hour, causing formation of a white solid. This was filtered at room temperature and recrystallized from water. The ethylene bis-(N-carbamylmaleamate) was obtained in 73% yield, melting point 184–186° C.

*Analysis.*—Calcd. for $C_{12}H_{14}N_4O_8$: nitrogen, 16.37%. Found: nitrogen, 16.31%, 16.26%.

When the same reagents were heated in boiling dioxan for 48 hours in the absence of zinc chloride the ethylene bis-ester was obtained only in very impure form and in less than 1% yield, thus illustrating the tremendous catalytic effect of zinc chloride.

EXAMPLE 12

Raw castor oil (AA grade) and N-carbamylmaleimide were mixed in various proportions and heated at 100° C. in the presence or absence of zinc chloride as shown below. The mixtures were then washed at room temperature repeatedly with aqueous sodium bicarbonate to remove any remaining N-carbamylmaleimide and zinc chloride. Nitrogen analysis of the products showed the average extent of reaction.

| Run | Feed [a] | $ZnCl_2$ (mols) | Heating Time (Hrs.) | Product Nitrogen (percent) | Product Mole [a] Ratio |
|---|---|---|---|---|---|
| A[b] | 2.0 | 0.0 | 45 | 2.02 | 0.8 |
| B | 2.8 | 0.1 | 6 | 4.08 | 2.0 |
| C | 1.5 | 0.1 | 6 | 2.94 | 1.2 |

[a] Mols of N-carbamylmaleimide per mol of castor oil.
[b] The reaction was carried out in dioxane.

These products "dried" in the presence of cobalt and manganese naphthenates to form useful, hard varnish films. In this property these products behaved like dehydrated castor oil. Product B also was found to be a suitable plasticizer for urea-formaldehyde resins.

EXAMPLES 13–17

N-carbamylmaleimide was reacted with each of the following polyglycols, having the structure

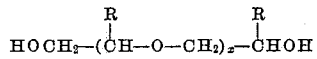

where R is hydrogen or methyl, and $x$ is an integer which can be varied widely, in the approximate molar proportion of 2:1, in the presence of zinc chloride (0.2% of the total weight of the reagents) for a few hours at 90–95° C.; i. e., until substantially all of the hydroxyl groups were converted to maleuric ester groups.

| Example | Polyglycol | Average Molecular Weight |
|---|---|---|
| 13 | Polyethylene glycol | 600 ($x$=about 12). |
| 14 | ___do___ | 6,000 ($x$=about 135). |
| 15 | Polypropylene glycol | 400 ($x$=about 6). |
| 16 | ___do___ | 750 ($x$=about 12). |
| 17 | ___do___ | 1,200 ($x$=about 19). |

EXAMPLES 18–28

The following examples illustrate the use in our invention of alkyd resins having terminal carbinol groups.

N-carbamylmaleimide was reacted with each of the following alkyd resins, in the approximate molar proportion of 2:1, in the presence of zinc chloride (1.0% of the total weight of the reagents) for a few hours at 80–95° C.; i. e., until substantially all of the hydroxyl groups were converted to maleurate ester groups.

| Example | Alkyd Resin | Average Molecular Weight of Alkyd Resin |
|---|---|---|
| 18 | A. Phthalic anhydride:ethylene glycol | 1,475 |
| 19 | B. Phthalic anhydride:adipic acid:ethylene glycol | 770 |
| 20 | C. Succinic acid:diethylene glycol | 1,545 |
| 21 | D. Adipic acid:ethylene glycol:propylene glycol | 1,285 |
| 22 | E. Adipic acid:ethylene glycol:propylene glycol | 1,870 |
| 23 | F. Adipic acid:ethylene glycol:propylene glycol | 3,180 |
| 24 | G. Tetrachlorophthalic acid:adipic acid:ethylene glycol:glycerol | 2,140 |
| 25 | H. Sebacic acid:propylene glycol:glycerol | 1,790 |
| 26 | I. Adipic acid:ethylene glycol: diethylene glycol | 2,295 |
| 27 | J. 3,6-Endomethylene-tetrahydrophthalic anhydride:diethylene glycol | 1,535 |
| 28 | K. Maleic anhydride:adipic acid:diethylene glycol | 1,710 |

These maleurates were viscous, clear, pale yellow to amber liquids, i. e., they looked almost like the unreacted alkyd resins. However, the new products, unlike alkyd resins A to I, are copolymerizable with conjugated alkadienes, as shown hereinafter, to form useful new rubbery products.

The alkyd resins in Examples 18–28 were made by the following well known general procedure:

A dicarboxylic acid, or mixture of such acids, was heated with more than an equimolar amount of a glycol or mixture of glycols [1] for several hours, i. e., until the acid number was almost zero. Throughout the heating an inert gas, e. g., nitrogen or carbon dioxide, was passed through the mixture in order to remove the water of esterification more rapidly and to protect the alkyd against the darkening effect of gaseous oxygen. Then the mixture was heated in vacuo in order to remove excess glycol. The hydroxyl content of the alkyd was determined, and from that the average molecular weight was calculated. The following table shows the details of the preparation of alkyds A to K by the above procedure.

| Alkyd | Reagents | | Products | |
|---|---|---|---|---|
| | Name | Amount (moles) | Hydroxyl Content (by weight), percent | Mol. Wt. |
| A | Phthalic anhydride<br>Ethylene glycol | 3.0<br>4.2 | 2.31 | 1,475 |
| B | Phthalic anhydride<br>Adipic acid<br>Ethylene glycol | 2.0<br>2.0<br>5.6 | 4.42 | 770 |
| C | Succinic acid<br>Diethylene glycol | 2.0<br>2.4 | 2.20 | 1,545 |
| D | Adipic acid<br>Ethylene glycol<br>Propylene glycol | 5.7<br>5.6<br>2.4 | 2.65 | 1,285 |
| E | Adipic acid<br>Ethylene glycol<br>Propylene glycol | 5.7<br>5.6<br>2.4 | 1.75 | 1,870 |
| F | Adipic acid<br>Ethylene glycol<br>Propylene glycol | 5.7<br>5.6<br>2.4 | 1.07 | 3,180 |
| G | Tetrachlorophthalic acid<br>Adipic acid<br>Ethylene glycol<br>Glycerol | 2.0<br>2.0<br>3.87<br>0.63 | 1.59 | 2,140 |
| H | Sebacic acid<br>Propylene glycol<br>Glycerol | 4.0<br>4.2<br>0.4 | 1.90 | 1,790 |
| I | Adipic acid<br>Ethylene glycol<br>Diethylene glycol | 8.0<br>4.8<br>4.8 | 1.48 | 2,295 |
| J | 3,6-Endomethylene-tetrahydrophthalic anhydride.<br>Diethylene glycol | 4.0<br>4.8 | 2.22 | 1,535 |
| K | Maleic anhydride<br>Adipic acid<br>Diethylene glycol | 3.0<br>3.0<br>7.2 | 1.99 | 1,710 |

EXAMPLES 29–31

These examples illustrate the use in our invention of long-chain polyhydric alcohols containing sulfone groups in the chain. These alcohols are made by the following general method.

Metallic sodium (0.01 mol) was dissolved in a glycol (1.2 mols) at an elevated temperature, e. g., about 75–100° C. The solution was then cooled to room temperature. Divinyl sulfone (1.00 mol) was added gradually to the rapidly stirred solution. Usually, a vigorous exothermic reaction took place at once, but occasionally the mixture had to be heated gently to initiate the reaction. After the evolution of heat had ended, the solution was heated for several hours at an elevated temperature,

[1] Glycerol is broadly considered as a "glycol" herein, although it contains three hydroxyl groups (see expecially alkyd G).

e. g., over night at 150° C., to complete the reaction. Three typical polymeric alcohols so formed are shown:

| Example | Glycol Used As Reagent | Average Molecular * Weight of Product |
|---|---|---|
| 29 | Diethylene Glycol | 1,000 |
| 30 | Pentamethylene glycol | 1,300 |
| 31 | Octanediol-1,2 | 970 |

* Calculated from hydroxyl content.

The sulfur-containing glycols so made can be given the following idealized structure:

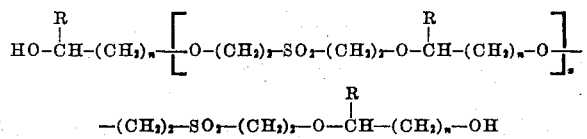

$$-(CH_2)_x-SO_2-(CH_2)_x-O-\overset{R}{\underset{|}{C}}H-(CH_2)_n-OH$$

where R is hydrogen or an alkyl radical, and $n$ and $x$ are integers. (This structure is given only for illustration, and in no sense is a limitation of our invention.)

Each of these sulfur-containing glycols was mixed with slightly more than two molar proportions of N-carbamylmaleimide and about 1% (based on the total weight of the mixture) of finely divided anhydrous zinc chloride, and then heated at 100° C. for a few hours, i. e., for a sufficient time to form the dimaleurate. The products were clear, yellow to amber, viscous liquids.

These products are copolymerizable with butadiene to form useful, highly polar elastomers. The sulfur-containing glycols from which these new products were made do not copolymerize with butadiene. Thus is shown the beneficial effect of the maleurate ester groups.

EXAMPLE 32

Raw, alkali-refined linseed oil was conventionally "blown," i. e., oxidized at the carbon-carbon double bonds to introduce hydroxyl groups, until its viscosity was about ten times that of the raw oil. The blowing process was carried out by bubbling air rapidly through the oil at 140° C. for 11 hours. A mixture of 250 parts of this blown oil (containing 1.7% free hydroxyl groups), 15 parts of N-carbamylmaleimide and 1.0 part of powdered anhydrous zinc chloride was heated and stirred for 10 hours at 93–95° C. in order to convert substantially all of the hydroxyl groups to maleurate groups. The product was a clear, viscous amber liquid.

EXAMPLE 33

A mixture of 11.2 parts of alkyd resin E, 2.0 parts of N-carbamylitaconimide and 0.1 part of powdered anhydrous zinc chloride was heated and stirred for about three hours at 93–96° C. in order to effect esterification of substantially all of the hydroxyl groups.

The new di-itaconurate was a clear, pale yellow, viscous liquid.

EXAMPLE 34

The experiment of Example 33 was repeated except that N-carbamylcitraconimide was used instead of N-carbamylitaconimide. The new di-citraconurate was a clear, yellow, viscous liquid.

EXAMPLE 35

A mixture of 1.96 parts of N-(n-butylcarbamyl)-maleimide, 1.08 parts of benzyl alcohol and 0.05 part of zinc chloride was heated at 85–90° C. for 30 minutes. The mixture was then poured into ice water to precipitate the new product, benzyl N-(n-butylcarbamyl)-maleamate. It was recrystallized from a mixture of water and methanol. The white product was formed in 78% yield or 2.4 parts. Melting point, 65.5–66.5° C.

*Analysis.*—Calcd. for $C_{16}H_{20}O_4N_2$: carbon, 63.1%; hydrogen, 6.58%; nitrogen, 9.20%. Found: carbon, 63.8%, 63.8%; hydrogen, 6.69%, 6.71%; nitrogen, 9.34%, 9.34%.

EXAMPLE 36

A mixture of 3.92 parts of N-(tert-butylcarbamyl)-maleimide, 2.16 parts of benzyl alcohol and 0.05 part of zinc chloride was heated at 80–90° C. for 45 minutes. The mixture was then digested in boiling water for a few minutes and cooled. The new, white compound, benzyl N-(tert-butylcarbamyl)-maleamate, was filtered, washed with water, and recrystallized from a mixture of methanol and water. The white product was formed in 90% yield (5.5 parts). Melting point, 70.0–72.5° C.

*Analysis.*—Calcd. for $C_{16}H_{20}O_4N_2$: carbon, 63.1%; hydrogen, 6.58%; nitrogen, 9.20%. Found: carbon, 63.2%, 63.3%; hydrogen, 6.63%, 6.63%; nitrogen, 9.22%, 9.14%.

EXAMPLE 37

A mixture of 4.32 parts of N-(phenylcarbamyl)-maleimide, 2.16 parts of benzyl alcohol, 0.05 part of zinc chloride and 8 parts of benzene was boiled under reflux for an hour, and then was allowed to cool. The mass of crystals was broken up, the mixture was diluted somewhat with ether, and the product was filtered, washed with ether and then recrystallized from methanol. The new, white compound, benzyl N-(phenylcarbamyl)-maleamate, was formed in 77% yield (5.0 parts). Melting point, 131.0–133.5° C.

*Analysis.*—Calcd. for $C_{18}H_{16}O_4N_2$: carbon, 66.7%; hydrogen, 4.97%; nitrogen, 8.63%. Found: carbon, 66.7%; hydrogen, 4.99%; nitrogen, 8.48%.

EXAMPLE 38

A mixture of 3.92 parts of N-(tert-butylcarbamyl)-maleimide, 5 parts of isopropanol and 0.05 part of zinc chloride was heated at 75–85° C. for 150 minutes, and then was evaporated to half volume. The white product, which crystallized on cooling, was filtered and recrystallized from Skellysolve B. The isopropyl N-(tert-butylcarbamyl)-maleamate was formed in 88% yield (4.35 parts). Melting point, 96–97° C.

*Analysis.*—Calcd. for $C_{12}H_{20}O_4N_2$: carbon, 56.2%; hydrogen, 7.81%; nitrogen, 10.90%. Found: carbon, 56.9%, 57.1%; hydrogen, 7.88%, 7.85%; nitrogen, 10.99%, 10.99%.

EXAMPLE 39

A mixture of 4.32 parts of N-(phenylcarbamyl)-maleimide, 10 parts of isopropanol and 0.05 part of zinc chloride was heated at 75–85° C. for 150 minutes. On cooling, the new, white compound, isopropyl N-(phenylcarbamyl)-maleamate, crystallized. It was filtered and recrystallized from isopropanol. Yield, 3.8 parts, or 71%. Melting point, 132–133° C.

*Analysis.*—Calcd. for $C_{14}H_{16}O_4N_2$: carbon, 60.8%; hydrogen, 5.83%; nitrogen, 10.11%. Found: carbon, 61.4%, 61.1%; hydrogen, 5.72%, 5.74%; nitrogen, 10.17%, 10.19%.

These examples illustrate further the great breadth of our new reaction, but the examples are not to be construed as limiting the invention. The N-carbamylimides react broadly with compounds containing non-tertiary alcoholic hydroxyl groups, whether or not tertiary alcoholic hydroxyl groups are present.

Typical N-carbamylamic esters which can be made by our process are methyl maleurate, ethyl maleurate, n-propyl maleurate, isopropyl maleurate, n-butyl maleurate, sec-butyl maleurate, isobutyl maleurate, n-amyl maleurate, n-hexyl maleurate, n-heptyl maleurate, n-octyl maleurate, 2-ethylhexyl maleurate, n-decyl maleurate, n-dodecyl maleurate, n-tetradecyl maleurate, n-hexadecyl maleurate, n-octadecyl maleurate, allyl maleurate, methallyl maleurate, 2-hydroxyethyl maleurate, 2-ethoxyethyl maleurate, 2-chloroethyl maleurate, benzyl maleurate, 2-(N-morpholino)-ethyl maleurate, 2-nitrobutyl maleurate, ethylene dimaleurate, propylene dimaleurate, trimethylene dimaleurate, the dimaleurate of diethylene glycol, mono- and dimaleurates of alkyd resins having terminal hydroxyl groups, mono- and polymaleurates of castor oil, mono- and polymaleurates of "blown" oils, mono- and polymaleurates of cellulose, mono- and polymaleurates of starch, mono- and polymaleurates of glucose, mono- and polymaleurates of sucrose, mono- and polymaleurates of cellulose which has been partially esterified with other carboxylic acids or their anhydrides, mono- and polymaleurates of cellulose which has been partially etherified, mono- and polymaleurates of polyvinyl alcohol, mono- and polymaleurates of partially hydrolyzed polyvinyl acetate, methyl citraconurate, ethyl citraconurate, n-propyl citraconurate, isopropyl citraconurate, 2-ethylhexyl citraconurate, n-dodecyl citraconurate, n-octadecyl citraconurate, allyl citraconurate, methallyl citraconurate, 2-hydroxyethyl citraconurate, 2-ethoxyethyl citraconurate, 2-chloroethyl citraconurate, benzyl citraconurate, ethylene dicitraconurate, propylene dicitraconurate, the dicitraconurate of diethylene glycol, mono- and dicitraconurates of alkyd resins having terminal hydroxyl groups, mono- and polycitraconurates of castor oil, mono- and polycitraconurates of "blown" oils, methyl itaconurate, ethyl itaconurate, propyl itaconurate, isopropyl itaconurate, 2-ethylhexyl itaconurate, n-dodecyl itaconurate, n-octadecyl itaconurate, allyl itaconurate, methallyl itaconurate, 2-hydroxyethyl itaconurate, 2-ethoxyethyl itaconurate, 2-chloroethyl itaconurate, benzyl itaconurate, ethylene diitaconurate, propylene diitaconurate, the diitaconurate of diethylene glycol, mono- and diitaconurates of alkyd resins having terminal hydroxyl groups, mono- and polyitaconurates of castor oil, mono- and polyitaconurates of "blown" oils, methyl N-(methylcarbamyl)-maleamate, isopropyl N-(methylcarbamyl)-maleamate, mono- and bis-[N-(methylcarbamyl)-maleamates] of alkyd resins having terminal hydroxyl groups, mono- and poly-[N-(methylcarbamyl)-malemates] of castor oil, mono- and poly-[N-(methylcarbamyl) - maleamates] of "blown" oils, methyl N-(n-butylcarbamyl)-maleamate, isopropyl N - (n - butylcarbamyl) - maleamate, benzyl N-(n-butylcarbamyl)-maleamate, mono- and bis-[N-(n-butylcarbamyl)-maleamates] of alkyd resins having terminal hydroxyl groups, isopropyl N-(tert-butylcarbamyl)-maleamate, benzyl N-(tert-butylcarbamyl)-maleamate, mono- and bis - [N-(tert-butylcarbamyl)-maleamates] of alkyd resins having terminal hydroxyl groups, isopropyl N-(phenylcarbamyl)-maleamate, benzyl N-(phenylcarbamyl)-maleamate, mono- and bis-[N-(phenylcarbamyl)-maleamates] of alkyd resins having terminal hydroxyl groups, ethyl N - (tert - butylcarbamyl)-itaconamate, mono- and bis-[N-(tert-butylcarbamyl)-itaconamates] of alkyd resins having terminal hydroxyl groups, ethyl N-(phenylcarbamyl)-citraconamate, and mono- and bis-[N-(phenylcarbamyl)-citraconamates] of alkyd resins having terminal hydroxyl groups.

These N-carbamylamic esters, except as noted hereinafter, are valuable intermediates in forming useful new rubbery products by copolymerization with a conjugated diolefin. The copolymers are made conventionally in aqueous emulsion. The diolefin customarily is butadiene-1,3, but other diolefins, such as isoprene and piperylene, may also be used. The elastomers are, in general, more polar than most of the commercially available elastomers such as Hevea rubber and GR–S. Consequently, the new rubbers resist deterioration caused by liquid hydrocarbons, e. g., lubricating oils and gasoline, much better than do the said conventional rubbers. By a suitable choice of the N-carbamylamic ester, and of the proportion of ester to comonomer, we can vary the properties of the elastomers to fit individual uses. For example, elastomers made from the more highly polar esters are especially valuable in making products, e. g., hose, which must be in contact with gasoline. Such esters are methyl maleurate and other short-chain alkyl N-carbamylamates, beta-hydroxyethyl maleurate, ethylene dimaleurate, 2-hydroxy-5-tert-butyl-1,3-xylylene bismaleurate, beta-(1-morpholinyl)-ethyl maleurate, methyl itaconurate, methyl citraconurate, beta-chloroethyl maleurate, the ether-esters described in Examples 13–17, the alkyd maleurates described in Examples 18–28 (and particularly those made from alkyds of relatively low molecular weight or from those alkyds wherein there are many carboxylic ester groups relative to the length of the chain, e. g., the alkyds used in Examples 18–21, and 24, and the long-chain maleurates (described in Examples 29–31) having sulfone groups in the chain. When extremely high resistance to hydrocarbons is not important we may use elastomers made from N-carbamylamic esters which are less polar. Such esters are n-dodecyl maleurate, the castor oil maleurates shown in Example 12, and the maleurates of blown oils (described in Example 32). Elastomers made from these maleurates are more compatible with and can be blended more easily with conventional rubbers such as Hevea rubber and GR–S than can the more highly polar new elastomers discussed above. The esters (Examples 35–39) made from N-substituted ureas are somewhat less polar than the corresponding esters made from urea itself.

The following examples illustrate the preparation of typical elastomers made from N-carbamylamic esters of this invention.

EXAMPLES 40–47

Each of the following emulsions was heated at 50° C. with shaking for the time shown, and was then coagulated conventionally with acid. The dried copolymers were useful rubbery materials which were easily processable on conventional rubber machinery.

| Example | 40 | 41 | 42 | 43 | 44 | 45 | 46 | 47 |
|---|---|---|---|---|---|---|---|---|
| Butadiene | 90 | 70 | 90 | 70 | 90 | 90 | | |
| Isoprene | | | | | | | 80 | 70 |
| Methyl maleurate | 10 | 30 | | | | | | |
| n-Butyl maleurate | | | 10 | 30 | | | 20 | 30 |
| n-Octyl maleurate | | | | | 10 | | | |
| Maleurate of Example 22 | | | | | | 10 | | |
| MTM a | 0.5 | 0.3 | 0.3 | 0.67 | 0.2 | 0.3 | 0.3 | 0.3 |
| Potassium persulfate | 0.5 | 0.5 | 0.5 | 1.33 | 0.5 | 0.5 | 0.5 | 0.5 |
| Aquarex ME b | 5.0 | 5.0 | 5.0 | 6.7 | 5.0 | 5.0 | 5.0 | 5.0 |
| Water | 180 | 180 | 180 | 270 | 180 | 180 | 180 | 180 |
| Time (hours) | 32 | 24 | 16 | 24 | 20 | 32 | 41 | 62 |
| Percentage conversion | 55 | 94 | 54 | 78 | 53 | 18 | 70 | 35 |
| Mooney Viscosity (ML–4) | 53 | 75 | 95 | 10 | | | | | a Mixture of tert-alkyl mercaptans having 8–16 carbon atoms.
b Sodium lauryl sulfate.

The N-carbamylamic esters of cellulose or its derivatives, which cannot be emulsified because of their insoluble, polymeric nature, do not form rubbery copolymers with diolefins. However, they are useful per se, because, as shown in Examples 6 and 7, the introduction of the N-carbamylamido ester group improves the properties of the cellulose products.

Having thus described our invention, what we claim and desire to protect by Letters Patent is:

1. A method of preparing esters of alpha-olefinic N-carbamylamic acids which comprises reacting an N-carbamylimide of the corresponding alpha-olefinic dicarboxylic acid having two carbon atoms between the carbonyl groups with a compound containing a non-tertiary alcoholic hydroxyl group and wherein any amino group which may be present in the reactive hydroxyl compound is a tertiary amino group.

2. A method of preparing esters of alpha-olefinic N-carbamylamic acids which comprises reacting an N-carbamylimide of an alpha-olefinic dibasic acid, said acid having from four to six carbon atoms and having two carbon atoms between the carboxylic groups, the carbamyl group being

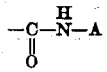

where A is a member selected from the class consisting of hydrogen and hydrocarbon radicals, with a compound containing a non-tertiary alcoholic hydroxyl group and wherein any amino group which may be present is a tertiary amino group.

3. An N-carbamyl-maleamic acid ester of castor oil.
4. Ethylene bis-(N-carbamylmaleamate).
5. A method as set forth in claim 1 in which the reactive compound containing a non-tertiary alcoholic hydroxyl group is an alkyd resin having terminal hydroxyl groups.
6. An N-carbamyl-maleamic acid ester of an alkyd resin having terminal hydroxyl groups.
7. An N-carbamyl-maleamic acid ester of a polyhydric alcohol having repeating alkylene ether groups.
8. An N-carbamyl-maleamic acid ester of a non-tertiary polyhydric alcohol containing a sulfone group linking carbon atoms.
9. A method of preparing N-carbamyl-maleamic acid esters which comprises reacting N-carbamylmaleimide with a non-tertiary alcohol and wherein any amino group which may be present in the reactive alcohol compound is a tertiary amino group.
10. A method of preparing N-carbamyl-maleamic acid esters which comprises reacting N-carbamylmaleimide with a non-tertiary monohydric alcohol.
11. A method of preparing N-carbamyl-maleamic esters which comprises reacting N-carbamylmaleimide with a polyhydric alcohol having its hydroxyl groups attached to aliphatic carbon atoms at least one of which is a non-tertiary carbon atom and wherein any amino group which may be present in the reactive alcohol compound is a tertiary amino group.
12. An alpha-olefinic N-carbamylamic monocarboxylic acid ester of an aliphatic polyhydric alcohol containing a non-tertiary alcoholic hydroxyl group and wherein any amino group which may be present in the reactive hydroxyl compound is a tertiary amino group.
13. An alpha-olefinic N-carbamylamic monocarboxylic acid ester of a polyhydric compound of the general formula R'(OH)$_n$ where $n$ is an integer of at least two and R' is an aliphatic radical having a non-tertiary carbon atom directly attached to at least one of the alcoholic hydroxyl groups and wherein any amino group which may be present in the reactive hydroxyl compound is a tertiary amino group.
14. A method as set forth in claim 1 in which the reactive hydroxyl compound is a non-tertiary monohydric alcohol.
15. A method as set forth in claim 1 in which the reactive hydroxyl compound is a polyhydric alcohol having its hydroxyl groups attached to aliphatic carbon atoms at least one of which is a non-tertiary carbon atom.
16. A method as set forth in claim 1 in which the reactive compound containing a non-tertiary alcoholic hydroxyl group is castor oil.
17. A method as set forth in claim 1 in which the reactive compound containing a non-tertiary alcoholic hydroxyl group is a non-tertiary polyhydric alcohol having repeating alkylene ether groups.
18. A method as set forth in claim 1 in which the reactive compound containing a non-tertiary alcoholic hydroxyl group is a non-tertiary polyhydric alcohol containing a sulfone group linking carbon atoms.

References Cited in the file of this patent

UNITED STATES PATENTS 2,576,895    Adelson _____ Nov. 27, 1951

FOREIGN PATENTS 599,065    Great Britain _____ Mar. 3, 1948